(12) United States Patent
Tan

(10) Patent No.: US 10,620,475 B2
(45) Date of Patent: Apr. 14, 2020

(54) DUAL-VIEW DISPLAY PANEL AND DISPLAY DEVICE

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/029,517

(22) Filed: Jul. 6, 2018

(65) Prior Publication Data

US 2019/0101795 A1 Apr. 4, 2019

(30) Foreign Application Priority Data

Sep. 29, 2017 (CN) .......................... 2017 1 0910890

(51) Int. Cl.
| | |
|---|---|
| *G02F 1/1335* | (2006.01) |
| *G02F 1/13357* | (2006.01) |
| *H04N 13/00* | (2018.01) |
| *H04N 13/31* | (2018.01) |
| *G02B 27/10* | (2006.01) |
| *G02B 3/00* | (2006.01) |
| *G02B 30/26* | (2020.01) |
| *G02F 1/1343* | (2006.01) |

(52) U.S. Cl.
CPC ..... *G02F 1/133606* (2013.01); *G02B 3/0056* (2013.01); *G02B 27/1086* (2013.01); *G02B 30/26* (2020.01); *G02F 1/133512* (2013.01); *H04N 13/00* (2013.01); *H04N 13/31* (2018.05); *G02F 1/133514* (2013.01); *G02F 1/133603* (2013.01); *G02F 1/133617* (2013.01); *G02F 2001/133607* (2013.01); *G02F 2001/134372* (2013.01); *G02F 2201/30* (2013.01); *G02F 2202/36* (2013.01)

(58) Field of Classification Search
CPC ......... G02F 1/133606; G02F 1/133514; G02F 1/133512; G02F 1/133617; G02F 1/133603; G02F 2001/133607
See application file for complete search history.

(56) References Cited

U.S. PATENT DOCUMENTS

| | | | |
|---|---|---|---|
| 6,876,408 B2 * | 4/2005 | Yamaguchi | .......... G02B 3/0031 349/57 |
| 8,177,408 B1 * | 5/2012 | Coleman | ................ G02B 3/005 362/615 |

(Continued)

*Primary Examiner* — Hoan C Nguyen
(74) *Attorney, Agent, or Firm* — Foley & Lardner LLP

(57) ABSTRACT

The present disclosure provides a dual-view display panel and a display device. The dual-view display panel includes a backlight source, a liquid crystal grating and a color film layer. The backlight source is configured to provide a collimated light. The liquid crystal grating is provided in a light-exiting direction of the backlight source. The color film layer is provided on a side of the liquid crystal grating away from the backlight source. The color film layer comprises a plurality of first pixel areas and a plurality of second pixel areas. A light-shielding area is provided between the first pixel area and the second pixel area which are adjacent to the light-shielding area. The liquid crystal grating is used to diffract the collimated light emitted by the backlight source to the first pixel area or the second pixel area.

15 Claims, 5 Drawing Sheets

(56) References Cited

U.S. PATENT DOCUMENTS

| | | | |
|---|---|---|---|
| 2004/0150329 A1* | 8/2004 | Asai | H01L 51/5275 313/506 |
| 2008/0018827 A1* | 1/2008 | Yamamoto | G02F 1/133606 349/64 |
| 2010/0060817 A1* | 3/2010 | Park | G02B 5/02 349/64 |
| 2014/0132890 A1* | 5/2014 | Zhang | G02F 1/133514 349/69 |
| 2015/0022758 A1* | 1/2015 | Hwang | G02B 5/0226 349/64 |

* cited by examiner

DUAL-VIEW DISPLAY PANEL AND DISPLAY DEVICE

CROSS REFERENCE

This application is based upon and claims priority to Chinese Patent Application No. 201710910890.3, filed on Sep. 29, 2017, the entire contents thereof are incorporated herein by reference.

TECHNICAL FIELD

The present disclosure relates to a display technique field, and in particular to a dual-view display panel and a display device provided by the dual-view display panel.

BACKGROUND

A dual-view angle (also called dual image) display refers to that the same displayer displays different images at different angles, that is to say, the user may observe different images from different angles of a display screen. The dual-view angle display may be used in a vehicle-in displayer. For example, through the dual-view angle displayer, passengers on different seats in the vehicle can observe different images by means of the same displayer, in this case, there is no need to provide respective displayer for each passenger. Such arrangement not only saves cost of arranging the displayer, but also reduces occupation of space in the vehicle.

However, the dual-view display panel in the prior art may generate a central crosstalk area. The presence of the central crosstalk area will greatly reduce on-the-spot experience as provided by the dual-view technology.

Therefore, there is a need to develop an inventive dual-view display panel and a display device provided with the dual-view display panel.

The information as disclosed in the Background merely serves to enhance understanding of the background of the present disclosure, and thereby including information that does not form the prior art that has already known to an ordinary person skilled in the art.

SUMMARY

According to some arrangements of the present disclosure, a dual-view display panel includes a backlight source for providing a collimated light, a liquid crystal grating provided in a light-exiting direction of the backlight source, a color film layer provided on a side of the liquid crystal grating away from the backlight source, in which the color film layer comprises a plurality of first pixel areas and a plurality of second pixel areas; and a light-shielding area is provided between the first pixel area and the second pixel area which are adjacent to the light-shielding area. The liquid crystal grating is used to diffract the collimated light emitted by the backlight source to the first pixel area or the second pixel area.

In one exemplary arrangement of the present disclosure, the backlight source includes a plurality of light-emitting sources, a lens layer provided on the light-emitting source, the lens layer comprises a plurality of lenses arranged side by side, and the lens is used to refract light emitted from the light-emitting source to form the collimated light, a first shielding layer disposed on the lens layer, the first shielding layer comprises a plurality of light-exiting ports and a plurality of first light-shielding areas which are spaced apart from one another, the collimated light is radiated through the light-exiting port to form the backlight source, and the light-exiting port and the light-shielding area are arranged around the same center axis.

In one exemplary arrangement of the present disclosure, the light-emitting source is located on a focal plane of the lens.

In one exemplary arrangement of the present disclosure, the backlight source further includes a second shielding layer provided between the light-emitting source and the lens layer, and the second shielding layer comprises a plurality of light-transmitting ports and a plurality of second light-shielding areas which are spaced apart from one another, the light-transmitting ports and the light-emitting sources are arranged around the same center axis, and the second light-shielding area is used to shield lights outside an aperture of the lends.

In one exemplary arrangement of the present disclosure, the light-exiting port is located at a central position of the lens.

In one exemplary arrangement of the present disclosure, the light-exiting port includes a first sub-light-exiting port through which the light is diffracted to be exited through the first pixel area, a second sub-light-exiting port through which the light is diffracted to be exited through the second pixel area.

In one exemplary arrangement of the present disclosure, the first sub-light-exiting port and the second sub-light-exiting port are symmetrically arranged relative to the center axis of the first light-shielding area perpendicular to the a light-shielding surface.

In one exemplary arrangement of the present disclosure, an opening size of the light-exiting port is smaller than a size for shielding light of the first light-shielding area.

In one exemplary arrangement of the present disclosure, the dual-view display panel further includes a light-receiving grating provided on the light-exiting port such that the collimated light is exited from the light-exiting port.

In one exemplary arrangement of the present disclosure, a quantum dot color film is provided on the color film layer.

According to some arrangements of the present disclosure, a dual-view display panel includes a backlight source for providing a collimated light, a liquid crystal grating provided in a light-exiting direction of the backlight source, a color film layer provided on a side of the liquid crystal grating away from the backlight source, in which the color film layer comprises a plurality of first pixel areas and a plurality of second pixel areas; and a light-shielding area is provided between the first pixel area and the second pixel area which are adjacent to the light-shielding area. The liquid crystal grating is used to diffract the collimated light emitted by the backlight source to the first pixel area or the second pixel area.

According to some arrangements of the present disclosure, a dual-view display panel includes the dual-view display panel described herein.

BRIEF DESCRIPTION OF THE DRAWINGS

The foregoing and other features and advantages of this disclosure will become more apparent from the illustrative implementations as described in details when taken in conjunction with the accompanying drawings.

Figure 1:
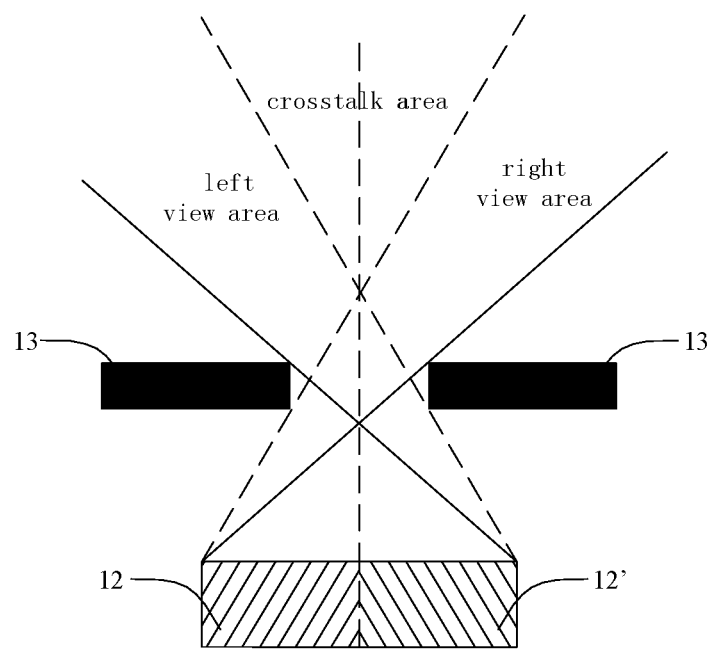
FIG. 1 is a schematic view of an implementation principle of a dual-view display technology in the prior art.

Reference numbers of the major elements in the drawings are described as follows: 1. light-emitting source; 2. lens; 3. first shielding layer; 31. Light-receiving grating; 311. first sub-light-receiving grating; 312. second sub-light-receiving grating; 32. first light-shielding area; 33. light-exiting port; 4. second shielding layer; 41. light-transmitting port; 42. second light-shielding area; 5. backlight source; 6. first substrate; 7. color film layer; 71. first pixel area; 72. second pixel area; 73. light-shielding area; 8. liquid crystal layer; 9. orientation layer; 10. controlling electrode; 101. common electrode layer; 102. insulating layer; 103. pixel electrode layer; 11. second substrate; 12. pixel; 13. obstacle

DETAILED DESCRIPTION

Now, the exemplary arrangements will be described more fully with reference to the accompany drawings. However, the exemplary arrangements can be implemented in various forms and should not be construed as limited to the arrangements set forth herein. Instead, these arrangements are provided so that this disclosure will be thorough and complete, and the concept of the exemplary arrangement will fully conveyed to those skilled in the art. Same reference signs denote the same or similar structures in the accompany drawings, and thus the detailed description thereof will be omitted.

As shown in FIG. 1, the dual-view display structure in the related art includes a liquid crystal display (LCD) screen and an obstacle 13 located above the liquid crystal display screen. The obstacle 13 is provided with a light-transmitting slit that spans over two pixels adjacent to the obstacle 13. Referring to FIG. 1 showing a schematic view of an implementation principle of a dual-view display technology in the prior art, a user on the left can only observe one part of the pixel 12 on the display panel through the light-transmitting slit; and a user on the right can only observe the other part of pixel 12' on the display panel through the light-transmitting slit; thereby the dual-view display can be a achieved by inputting different image signals in the pixel 12 visible to the user on the left and the pixel 12' visible to the user on the right. However, the dual-view display panel based on the existing art will generate a central crosstalk area, and the presence of such central crosstalk area will greatly reduce on-the-spot experience provided by the dual-view technology.

Figure 2:
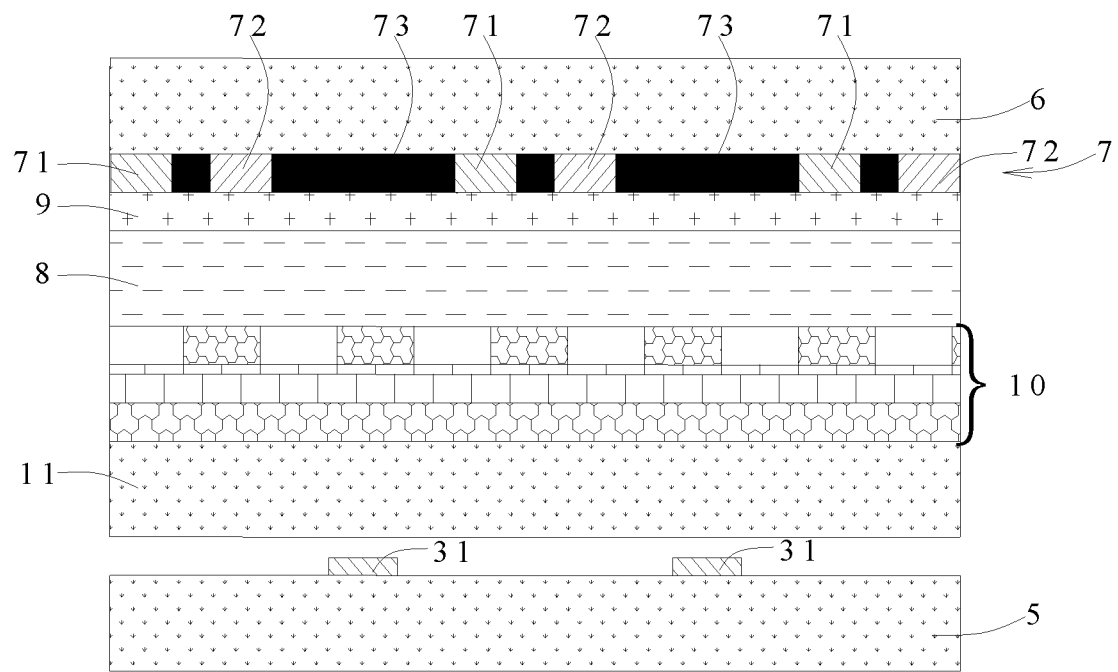
FIG. 2 is a schematic structural view of one arrangement of the dual-view display panel of the present disclosure.

Thereby, the present disclosure firstly provides a dual-view display panel. FIG. 2 is a schematic structural view of one arrangement of the dual-view display panel of the present disclosure. The dual-view display panel may include a color film layer 7, a liquid crystal grating and a backlight source 5, etc. The backlight source 5 can provide collimated light. The liquid crystal grating is provided in a light-exiting direction of the backlight source. The color film layer 7 is provided on a side of the liquid crystal grating away from the backlight source 5. The color film layer 7 includes a plurality of first pixel areas 71 and a plurality of second pixel areas 72. A light-shielding area 73 is provided between the first pixel area 71 and the second pixel area 72 which are adjacent to each other. The liquid crystal grating may be used for diffracting the collimated light emitted by the backlight source 5 into the first pixel area 71 or the second pixel area 72, and also may be used for diffracting the collimated light emitted by the backlight source 5 into the first pixel area 71 and the second pixel area 72.

Figure 3:
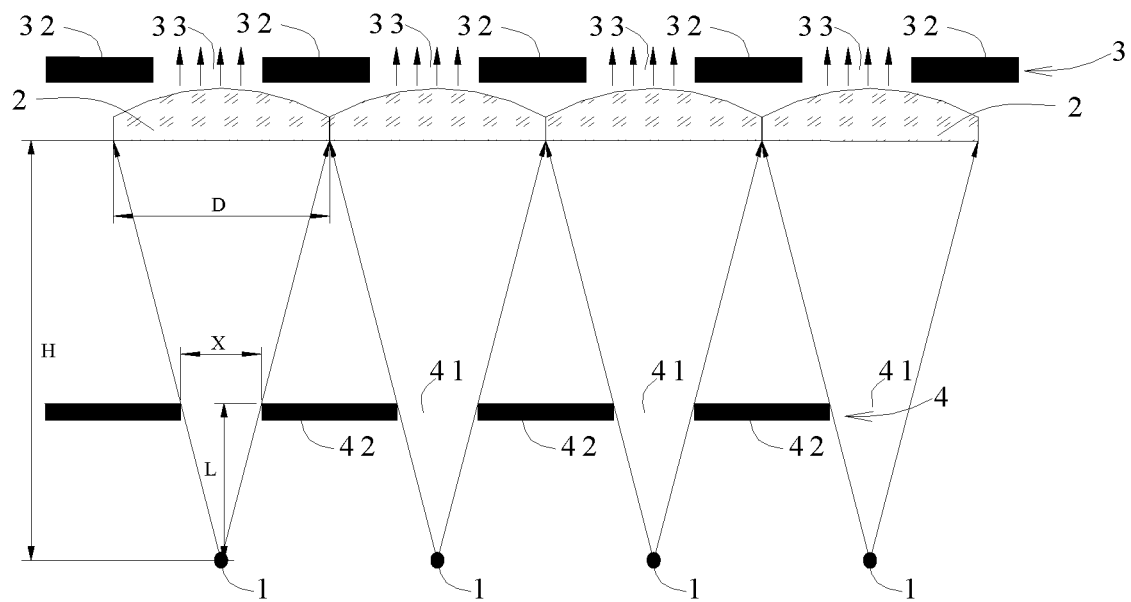
FIG. 3 is a schematic structural view of a backlight source in FIG. 2.

Referring to FIG. 3 showing the schematic structural view of the backlight source, the backlight source may include a light-emitting source 1, a lens layer, a first shielding layer 3, and a second shielding layer 4, etc.

The light-emitting source 1 may be configured to be in plural. In this exemplary arrangement, the light-emitting source 1 may be an OLED light source, or a Micro-LED dot-matrix light source or other light sources. The OLED is an abbreviation of an Organic Light Emitting Diod. The OLED light source has characteristics, such as active light emission, large view angle, fast response speed, stable image, high brightness, rich colors, and high resolution ratio. The Micro-LED dot-matrix light sources that are presented as miniature LEDs (Light Emitting Diodes) are provided in an array, and then in batch transferred onto a circuit substrate, and finally covered by a protective layer and an electrode, to be packaged, such that a surface light source is made. The Micro-LED dot matrix light source possesses characteristics such as ultra-high pixel count, ultra-high resolution ratio, lower power consumption, and long service life. The color of the light-emitting source 1 may be white light or monochromatic light, which is not particularly limited in this exemplary arrangement.

The lens layer is provided above the light-emitting source 1. The lens layer may include a plurality of lens disposed side by side. The light-emitting source 1 is located on a focal plane of the lens 2. In this exemplary implementation, the lens 2 is a convex lens, and light-emitting source 1 is located at the focus of lens 2, such that the light emitted by the light-emitting source 1 forms a parallel collimated light though the convex lens 2. The lenses 2 correspond to the light-emitting sources 1 one by one, that is, one light-emitting source 1 is correspondingly provided with one lens 2. The lights emitted by the plurality of light-emitting sources 1 form the collimated lights that are parallel to each other respectively through the plurality of lenses 2 that are corresponding to the light-emitting sources one by one. Of course, as long as the light-emitting source 1 is located on the focal plane of lens 2, it may not be located at the focal point of lens 2. But it is required that each light-emitting source 1 is located at a position as same as the focal plane of the lens 2 corresponding to the light-emitting source 1, for example, the focal plane of each lens 2 forms an identical rectangular coordinate with the focal point of the lens 2 as an initial point, and each light-emitting source 1 has a position the same as the position in the corresponding rectangular coordinate, such that a plurality of lens 2 permit the light emitted by the plurality of light-emitting sources 1 to form the same exit angle, that is, the lights emitted by the plurality of light-emitting sources form collimated lights parallel to each other.

The first shielding layer 3 is disposed on the lens layer. The first shielding layer 3 may include a plurality of light-exiting ports 33 and a plurality of first light-shielding areas 32, which are spaced apart from one another. The collimated light forms a backlight source 5 through the plurality of light-exiting ports 33. In this exemplary arrangement, the first shielding layer 3 and the lens layer may be disposed in parallel. Each of the lenses 2 may correspond to one light-exiting port 33. And the light-exiting port 33 may be located at a central position of the lens 2. The lights at the central position of the lens 2 have good collimation and monochromaticity, and thereby being not easy to form disadvantageous factors of the dual-view display panel, such as distortion, image aberration and color aberration. The light-exiting port 33 is provided with a light-receiving grating through which the collimated light may be uniformly emitted from the light-exiting port. Of course, if the light-emitting source 1 is located on the focal plane of the lens 2 but not located at the focal point, and the collimated light is required to be emitted perpendicular to the first shielding layer 3, the first shielding layer 3 may not be parallel to the lens layer, that is, the first shielding layer 3 and the lens layer form an angle therebetween, and size of the angle is determined according to the specific position of the light-emitting source 1. Herein, the related calculation is a prior art, and thereby omitted. In addition, in other exemplary implementations of the present disclosure, each of the lenses 2 may correspond to two light-exiting ports 33 or more light-exiting ports 33. The two light-exiting ports 33 or the more light-exiting ports 33 may be symmetrically arranged relative to the central position of the lens 2, which all fall within the protection scope of the present disclosure.

The second shielding layer 4 is disposed between the light-emitting source 1 and the lens layer. The second shielding layer 4 may include a plurality of light-transmitting ports 41 and a plurality of second light-shielding areas 42, which are spaced apart from one another. The light-transmitting port 41 and the light-emitting source 1 are arranged around the same center axis. The second light-shielding area 42 is used to shield the light outside an aperture of the lens 2, so that the opening size of the light-transmitting port 41 is related to the aperture of the lens 2, a distance between the light-emitting source 1 and the second shielding layer 4, and a distance between the light-emitting source 1 and the lens 2. In this exemplary implementation, a formula for calculating the size of the light-transmitting port 41 may be:

$$X = \frac{D}{H}L,$$

In this formula, X is the size of the light-transmitting port 41, D is the aperture of the lens 2, H is the distance between the light-emitting source 1 and the lens 2, and L is the distance between the light-emitting source 1 and the second shielding layer 4.

The light-emitting source 1 is disposed on the focal plane of the lens 2. The light emitted by light-emitting source 1 forms the collimated light through the lens 2. A first shielding layer 3 is disposed on the lens layer. The first shielding layer 3 is provided with a plurality of light-exiting ports 33 through which the collimated light is emitted to a backlight source 5. In some arrangements, various forms of backlight sources 5 can be formed through the light-exiting port 33 to meet the requirements of different dual-view display panels.

In other arrangements, the backlight source 5 provides a collimated light, so that the grating in the dual-view display panel brings about a better diffraction effect.

In this exemplary implementation, the liquid crystal grating is disposed in a light-exiting direction of the backlight source 5. The liquid crystal grating may be used to diffract the collimated light emitted from the light-exiting port 33 to the first pixel area 71 and/or the second pixel area 72. In this exemplary implementation, the liquid crystal grating may include an orientation layer 9 and a liquid crystal layer 8. The orientation layer 9 is used to determine an initial orientation direction of the liquid crystal layer 8, and different electric fields are applied to the liquid crystal layer 8 to form the liquid crystal grating with various parameters. The liquid crystal layer 8 is applied by controlling electrodes 10 in various electric fields by using an ADS (Advanced Super Dimension Switch) mode electrode, an IPS (In-Plane Switching) mode electrode, or a VA (Vertical Alignment) mode electrode and so on. In this exemplary implementation, the electrode may have a circle that is less than 5 mm. Wherein the ADS mode electrode is a mode in which the liquid crystal generates deflection by a lateral electric field generated by the electrodes on the same plane to realize the image display. The IPS mode electrode applies electric field in a horizontal manner, so that liquid crystal molecules are twisted parallel to a substrate, the liquid crystal molecules that are not applied by the electric field are aligned parallel to substrate, and upper and lower polarizing plates are arranged at a 90-degree so as to remain vertical. Of course, in other exemplary implementations of the present disclosure, the liquid crystal 8 is applied by two electrodes in various electric fields that may be disposed on both sides of the liquid crystal layer 8, respectively.

The color film layer 7 is disposed on a side of the liquid crystal grating away from the backlight source 5. The color film layer 7 may include a plurality of first pixel areas 71 and a plurality of second pixel areas 72. A light-shielding area 73 is provided between the first pixel area 71 and the second pixel area 72 which are adjacent to the light-shielding area 73. The light-shielding area 73 and the light-exiting port 33 are arranged around the same center axis. In this exemplary implementation, the light-shielding area 73 in a periodic array is disposed on the color film layer 7. The light-shielding area 73 has the first pixel area 71 on one side and the second pixel area 72 on the other side, in particular, the light-shielding area 73 has the first pixel area 71 on the right side and the second pixel area 72 on the left side. In this exemplary implementation, the first pixel area 71 may be referred to as a right pixel area, and the second pixel area 72 may be referred to as a left pixel area. The color film layer 7 is further provided with a quantum dot color film. The quantum dot color film may be an RGB three-color quantum dot color film. A single-color short wavelength is excited by the RGB three-color quantum dot color film to realize high-gamut color display, meanwhile, the view angle of the display panel can be largely improved by using scattering property of the quantum dot color film. Of course, it should be appreciated that the first pixel area 71 may also be an upper pixel area, and the second pixel area 72 may also be the lower pixel area.

Figure 4:
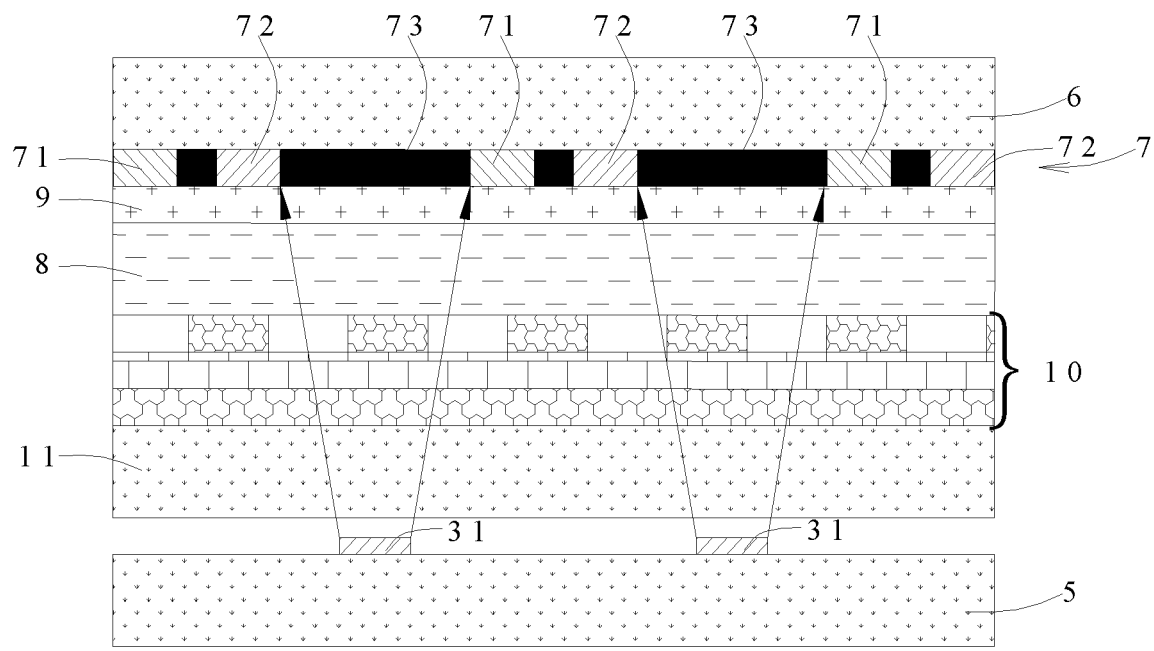
FIG. 4 is a schematic view showing a L0 grayscale of the dual-view display panel of the present disclosure.

Referring to FIG. 4 that is a schematic view showing a L0 grayscale of the dual-view display panel of the present disclosure, in this exemplary implementation, the size of the light-exiting port 33 may be smaller than the size of the light-shielding area 73, i.e., the opening size of the light-exiting port 33 may be smaller than the size of the light-shielding area 73. The collimated lights emitted from the liquid crystal grating are absorbed when they are radiated into the light-shielding area 73 of the color film layer 7, and thereby no light is emitted, at this time, being a dark state, the liquid crystal layer 8 does not need to apply the electric field. Of course, in other exemplary implementations of the present disclosure, the size of the light-exiting port 33 may also be not smaller than the size of the light-shielding area 73, instead, the collimated light may not pass through the liquid crystal layer 8 by adjusting the electric field applied to the liquid crystal layer 8.

Figure 5:
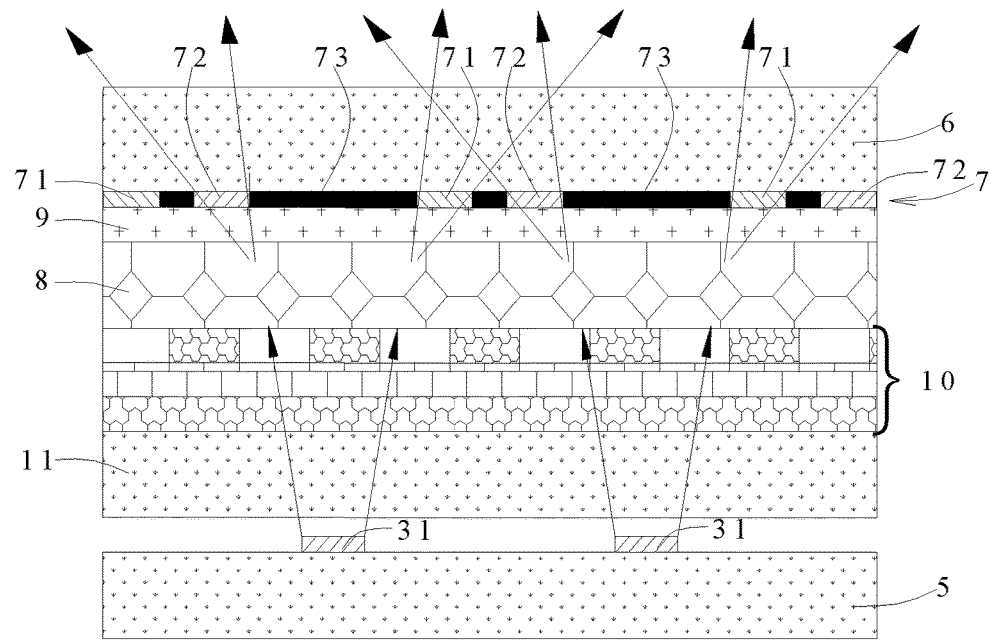
FIG. 5 is a schematic view showing L1 to L255 grayscale of the dual-view display panel of the present disclosure.

Referring to FIG. 5 that is a schematic view showing L1 to L255 grayscale display of the dual-view display panel of the present disclosure, when grayscale display is performed from L0 to L255, it is required to apply a determined electric field signal to the liquid crystal layer 8, at this time, the liquid crystal is periodically arranged to form a liquid crystal grating. The collimated light emitted from the light-exiting port 33 is radiated into the liquid crystal grating through the second substrate 11. The liquid crystal grating diffracts/refracts the collimated light, so that the diffracted light is correspondingly radiated into the first pixel area 71 and the second pixel area 72, and then radiated out through the first substrate 6. The light-exiting port and the light-shielding area are arranged around the same center axis to ensure that the diffracted lights radiated into the first pixel area 71 and the second pixel area 72 are symmetrical. If the electric fields applied to the liquid crystal layer 8 are different, the liquid crystal grating formed by the liquid crystal layer 8 have different parameters and different diffraction efficiency, so as to realize any grayscale display between L0 and L255.

Figure 6:
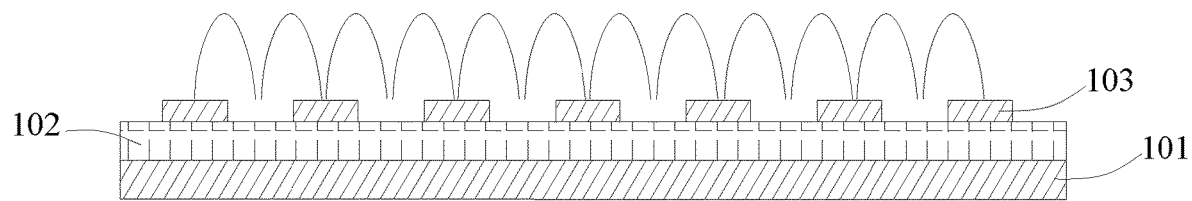
FIG. 6 is a schematic view of a liquid crystal grating profile formed by a liquid crystal layer in FIG. 5.

Referring to FIG. 6 showing a schematic view of a liquid crystal grating profile formed by a liquid crystal layer, in this exemplary implementation, the controlling electrode 10 employs an ADS electrode. The ADS electrode may include an insulating layer 102, a pixel electrode layer 103 located over the insulating layer 102, and a common electrode layer 101 located under the insulating layer 102. The pixel electrode may be a block-shaped electrode, and the common electrode may be a bar-shaped electrode. As shown in FIG. 6, two liquid crystal gratings may be formed in one electrode cycle. Of course, one liquid crystal grating is formed by a plurality of electrodes, which will not be particularly limited herein.

Figure 7:
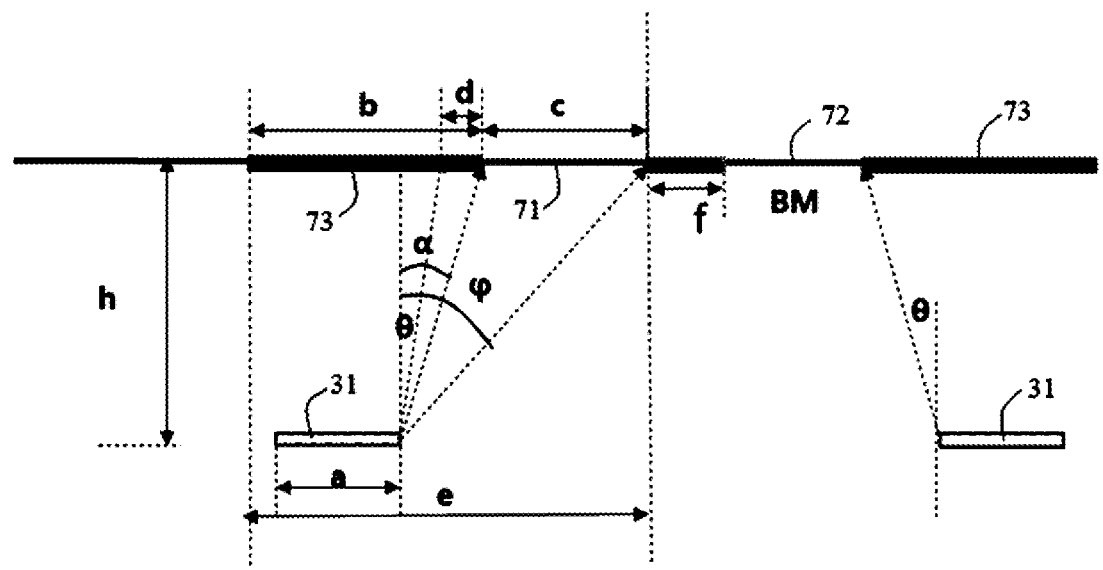
FIG. 7 is a schematic view of relevant parameter indication of a color film layer in FIG. 3.

Referring to FIG. 7 that is a schematic view of relevant parameter indication of a color film layer, geometric relationships are listed as follows:

$$b = a + (h*\tan\theta + d)*2 \tag{1}$$

$$\alpha = \arctan\frac{\tan\theta * h + d}{h} \tag{2}$$

$$\varphi = \arctan\left(\frac{c + h \tan \alpha}{h}\right) \tag{3}$$

In the foresaid formulas, $\alpha$ is a shielding angle, $\theta$ is a collimation angle, $\varphi$ is a viewable area angle, a is a width of the light-exiting port 33, e is a width of a light-exiting port unit, and b is a width of the light-shielding area 73, c is a width of a pixel area, d is a process deviation, h is a distance between the light-exiting port 33 and the color film layer, and f is a width of an anti-string color black matrix (which parameter may not be required in black and white display).

If the width a of the light-exiting port 33, the collimation angle $\theta$, the distance h between the light-exiting port 33 and the color film layer, and the process deviation d have been given, the width b of the light-shielding area 73 and the shielding angle $\alpha$ will be obtained.

For example, if the width a of light-exiting port 33 is equal to 10 the collimation angle $\theta$ is ±5°, the distance h between light-exiting port 33 and the color film layer is equal to 160 and the process deviation d is equal to 5 μm, it will be obtained that b is equal to 48 μm.

If the width c of a pixel area has been given, the viewable area angle $\varphi$ will be obtained. That is, the viewable area angle on the right side is $\alpha$-$\varphi$, and the viewable area angle on the left side is $(-\alpha)$-$(-\varphi)$.

Figure 8:
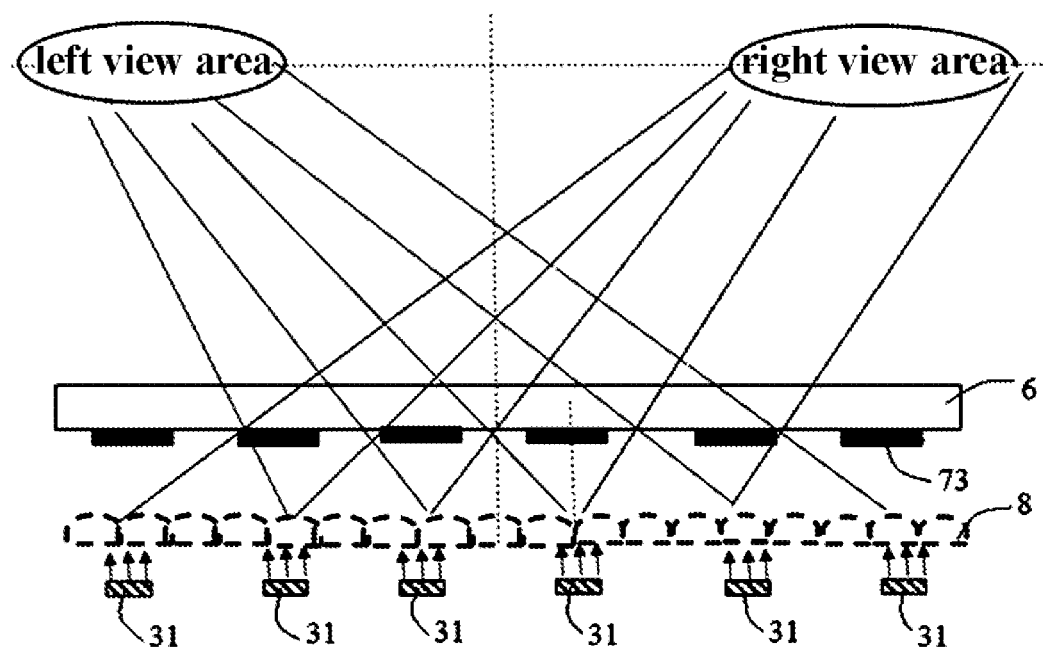
FIG. 8 is a schematic view showing implementation of a dual-view display effect of the dual-view display panel in FIG. 3.

Referring to FIG. 8 that is a schematic view showing implementation of a dual-view display effect of the dual-view display panel, the collimated lights (with the collimation angle $\theta$) emitted from the light-exiting port 33 are radiated at a diffraction angle $\theta_0$ upon the action of the diffraction of the liquid crystal grating, and then radiated at an appropriate diffraction angle to control the pixels at different positions on the liquid crystal display panel, that is, different display contents can be viewed at fixed positions in the left and right viewable areas. The diffraction angle can be controlled with reference to a grating equation below:

$$\sin\theta_0 - \sin\theta = m\lambda/P \ (m=0,\pm1,\pm2,\ldots) \tag{4}$$

In the above formula, m is a grating order, m=0, ±1, ±2 . . . ; $\lambda$ is a wavelength of the light, and P is a grating circle.

It could be obtained from aforesaid formula that the diffraction angle $\theta_0$ of the m-order diffraction wave of the grating can be determined only by the grating circle P, the wavelength $\lambda$ of an incident wave, and an incident angle $\theta$.

In general, an zero-order and a first-order diffraction of a transmission grating have a relatively larger diffraction intensity, and the diffraction intensity at a high-order diffraction is much smaller than that of the zero-order diffraction and the first-order diffraction. The zero-order diffraction wave is in a direction of the incident light, and a diffraction direction of the first-order diffraction wave may be regulated by the grating circle, so that the first-order diffraction wave is usually used to regulate angle of the lights. Of course, the zero-order diffraction wave may also be used when the light-exiting direction is equal to or close to the incident wave. If the light-exiting direction is given, the grating circle corresponding to different color light is determined by the formula (4). A duty ratio of the liquid crystal grating is generally about 0.5 which may be deviated in the practical product design, for example, in order to adjust the light-exiting intensity, to balance difference of the brightness at the different positions of the display panel, and due to the process conditions, and the like. The circle of the liquid crystal grating above each of the light-exiting ports 33 is changed while the positions of the color film layer 7 and the light-exiting port 33 are maintained unchanged, so that the lights exited from the pixels at the different positions may respectively reach the left and right view areas, so as to realize the dual-view display but without any crosstalk area.

Figure 9:
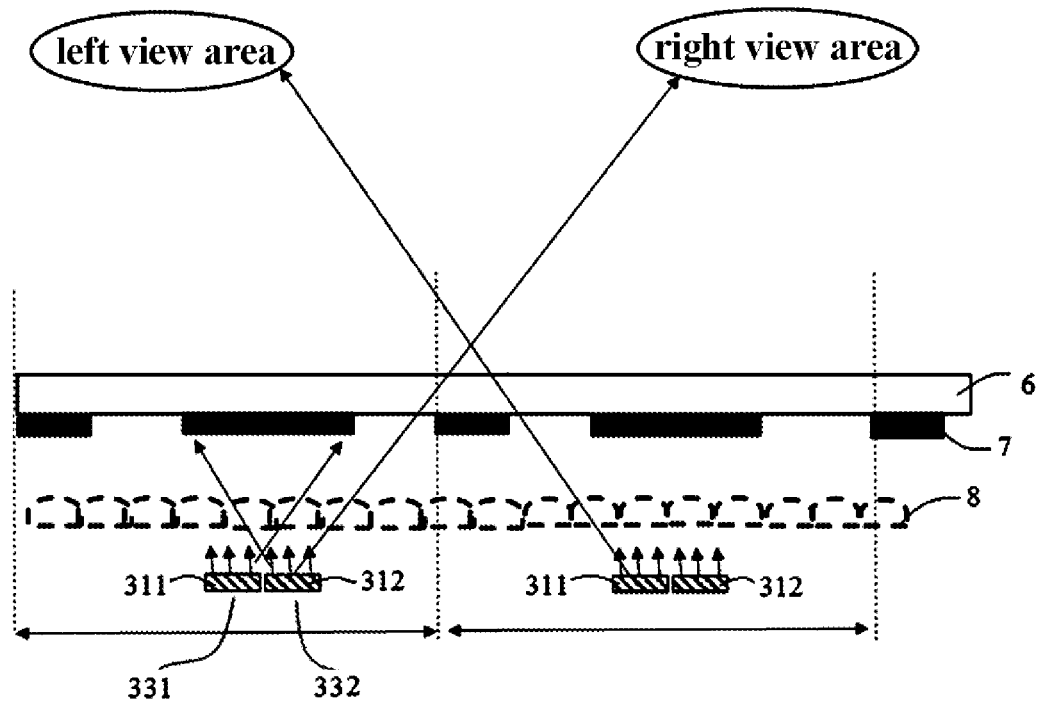
FIG. 9 is a schematic structural view of another arrangement of the dual-view display panel of the present disclosure.
Figure 10:
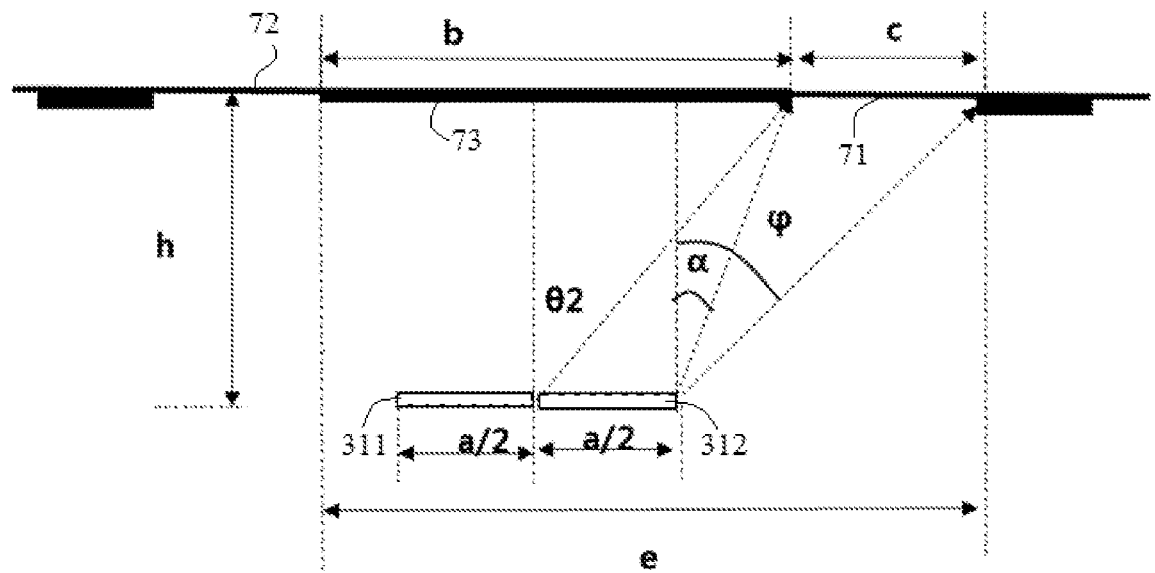
FIG. 10 is a schematic view of a parameter design of the dual-view display panel in FIG. 9.

Referring to FIG. 9 that is a schematic structural view of another arrangement of the dual-view display panel of the present disclosure, and referring to FIG. 10, the light-exiting port 33 may include a first sub-light-exiting port 331 and a second sub-light-exiting port 332. A first sub-light-receiving grating 311 is disposed on the first light-exiting port 331, and a second sub-light-receiving grating 312 is disposed on the second sub-light-exiting port 332. Lights can be radiated uniformly through the first sub-light-receiving grating 311 and the second sub-light-receiving grating 312. The collimated light through the first sub-light-exiting port 331 after being diffracted may be radiated through the second pixel area 72, correspondingly, the collimated light through the second sub-light-exiting port 332 after being diffracted may be radiated through the first pixel area 71; of course, the collimated light through the first sub-light-exiting port 331 after being diffracted may be radiated through the first pixel area 71, correspondingly, the collimated light through the second sub-light-exiting port 332 after being diffracted may be radiated through the second pixel area 72; that is, one sub-light-exiting port corresponds to one pixel area. In this exemplary implementation, the first sub-light-exiting port 331 and the second sub-light-exiting port 332 are arranged symmetrically relative to the central axis of the light-shielding area 73 perpendicular to the light-shielding surface. Moreover, the first sub-light-exiting port 331 may correspond to a plurality of electrodes, and the second sub-light-exiting port 332 may also correspond to a plurality of electrodes, and the plurality of electrodes may form a liquid crystal grating with a plurality of electrodes.

FIG. 10 is a schematic view of a parameter design of the dual-view display panel in FIG. 9. In order to make the display contents of the left view area different from the display contents of the right view area, ways of arranging the light-shielding area 73 on the color film layer 7 are different from those mentioned in the aforesaid arrangements. Compared with FIG. 7, $\theta_2$ is added into the FIG. 10. The $\theta_2$ is defined as a diffraction angle of the first sub-light-exiting port with respect to the right view area. The lights having an angle $\theta_2$ according to the design requirement cannot be exited through the right pixel area. The geometric relations are listed as follows:

$$\tan\theta_2 = \frac{b/2}{h} \quad (5)$$

Design Requirements $b \geq 2h * \tan\theta_2$ \quad (6)

As above described, if the distance h between the color film layer and the light-exiting port 33 has been given, it is required that the color film layer satisfies for the formula (6), and other design requirements are the same as those of the aforesaid arrangement.

Of course, for the person skilled in the art, it should be appreciated that different contents observed in the left and right view areas can be achieved in a time-sharing driving manner.

Further, the present disclosure also provides a dual-view display device. The dual-view display device may include the aforementioned dual-view display panel. The specific structure and principle of the dual-view display panel have been described in detail, and herein will be omitted.

The dual-view display panel and the display device thereof of the present disclosure can diffract the collimated light emitted by the backlight source 5 to the first pixel area 71 and/or the second pixel area 72 through the liquid crystal grating. On the one hand, the backlight source 5 can provide the collimated light, so that the liquid crystal grating in the dual-view display panel has a better diffraction effect; on the other hand, the lights transmitted from the first pixel area 71 and the second pixel area 72 are generated due to the diffraction of the liquid crystal grating, so that the first pixel area 71 and the second pixel area 72 cannot be observed simultaneously from the central area, so as to avoid generating the central crosstalk area.

The foresaid features, structures, or characteristics may be combined in one or more arrangements in any suitable manner, if possible, the characteristics as discussed in each of the arrangements may be interchangeable. Numerous specific details as above described are provided for fully understanding the arrangements of the present disclosure. However, it will be acknowledged for the person skilled in the art that the technical solutions of the present disclosure practiced without one or more of the specific details, or by using other methods, components, materials, etc. may be employed. In other instances, well-known structures, materials, or operations are not shown or described in detail to avoid obscuring various aspects of the present disclosure.

The relativity words, such as "upper" or "lower", as used herein, are directed to describe the relative relationship of the referenced component to another component. These words are used herein for convenience only, for example, according to the direction of the illustrative examples as shown in the figures. It should be appreciated that if the referenced device is inversed upside down, the component indicated as being the "upper" side would become the component on the "lower" side. When one structure is "on" another structure, it is possible to indicate that the one structure is integrally formed on the other structure, or the one structure is "directly" arranged on the other structure, or one structure is "indirectly" formed on the other structure by means of a further structure.

In the specification, the terms "a", "an", "the", "said" and "at least one", when describing element/constituent/or the like as described and/or shown herein, are used to express the presence of one or more the element/constitute/or the like. The terms "include", "comprise" and "have", as used herein, are intended to be inclusive, and mean there may be additional elements/constituents/or the like other than the listed elements/constituents/or the like. In addition, the words "first", "second", or the like, as used in claims, are meant to indication, but not to limit the object to which they modify.

It should be understood that this disclosure would never be limited to the detailed construction and arrangement of components as set forth in this specification. This disclosure has other arrangements that can be practiced or carried out in various ways. The foregoing variations and modifications fall within the scope of this disclosure. It should be understood that this disclosure would contain all alternative combination of two or more individual features as mentioned or distinct from in the text and/or in the drawings. All of these different combinations constitute a number of alternative aspects of this disclosure. The arrangements as illustrated in this specification are the best modes known to achieve this disclosure and will enable one skilled in the art to realize this disclosure.

What is claimed is:

1. A method for providing a dual-view display panel, the method comprising:
providing a backlight source configured to provide a collimated light;
providing a liquid crystal grating in a light-exiting direction of the backlight source;
providing a color film layer on a side of the liquid crystal grating away from the backlight source, wherein the color film layer comprises a plurality of first pixel areas and a plurality of second pixel areas; and
providing a light-shielding area between the first pixel area and the second pixel area which are adjacent to the light-shielding area;
wherein the liquid crystal grating is configured to diffract the collimated light emitted by the backlight source to the first pixel area or the second pixel area, wherein providing the backlight source comprises:
providing a plurality of light-emitting sources;
providing a lens layer on the light-emitting source, the lens layer comprises a plurality of lenses arranged side by side, and the lens layer is configured to refract light emitted from the light-emitting source to form the collimated light;
providing a first shielding layer disposed on the lens layer, the first shielding layer comprises a plurality of light-exiting ports and a plurality of first light-shielding areas which are spaced apart from one another, the collimated light is radiated through the light-exiting port to form the backlight source, and the light-exiting port and the light-shielding area are arranged around a same center axis,
wherein providing the backlight source further comprises:
providing a second shielding layer that is provided between the light-emitting source and the lens layer, and the second shielding layer comprises a plurality of light-transmitting ports and a plurality of second light-shielding areas which are spaced apart from one another, the light-transmitting ports and the light-emitting sources are arranged around the same center axis, and the second light-shielding area is used to shield lights outside an aperture of a lens of the plurality of lenses,
wherein a formula for calculating a size of the light-transmitting port is:

$$X = \frac{D}{H}L,$$

wherein X is the size of the light-transmitting port, D is an aperture of the lens, H is a distance between the light-emitting source and the lens, and L is a distance between the light-emitting source and the second shielding layer.

2. The method for providing the dual-view display panel according to claim 1, wherein the light-emitting source is located on a focal plane of the lens.

3. The method for providing the dual-view display panel according to claim 1, wherein the light-exiting port comprises:
a first sub-light-exiting port through which the light is diffracted to be exited through the first pixel area;
a second sub-light-exiting port through which the light is diffracted to be exited through the second pixel area,
wherein the first sub-light-exiting port and the second sub-light-exiting port are symmetrically arranged relative to the center axis of the first light-shielding area perpendicular to the a light-shielding surface.

4. The method for providing the dual-view display panel according to claim 1, wherein an opening size of the light-exiting port is smaller than a size for shielding light of the first light-shielding area.

5. The method for providing the dual-view display panel according to claim 1, wherein providing the dual-view display panel further comprises:
providing a light-receiving grating that is provided on the light-exiting port such that the collimated light is exited from the light-exiting port.

6. The method for providing the dual-view display panel according to claim 1, further comprising providing a quantum dot color film on the color film layer.

7. A dual-view display device, comprising:
a dual-view display panel, wherein the dual-view display panel comprises:
a backlight source for providing a collimated light;
a liquid crystal grating provided in a light-exiting direction of the backlight source;
a color film layer provided on a side of the liquid crystal grating away from the backlight source, wherein the color film layer comprises a plurality of first pixel areas and a plurality of second pixel areas;
a light-shielding area provided between the first pixel area and the second pixel area which are adjacent to the light-shielding area, wherein the liquid crystal grating is configured to diffract the collimated light emitted by the backlight source to the first pixel area or the second pixel area,
wherein the backlight source comprises:
a plurality of light-emitting sources;
a lens layer provided on the light-emitting source, the lens layer comprises a plurality of lenses arranged side by side, and the lens layer is configured to refract light emitted from the light-emitting source to form the collimated light;
a first shielding layer disposed on the lens layer, the first shielding layer comprises a plurality of light-exiting ports and a plurality of first light-shielding areas which are spaced apart from one another, the collimated light is radiated through the light-exiting port to form the backlight source, and the light-exiting port and the light-shielding area are arranged around a same center axis; and
a second shielding layer provided between the light-emitting source and the lens layer, and the second shielding layer comprises a plurality of light-transmitting ports and a plurality of second light-shielding areas which are spaced apart from one another, the light-transmitting ports and the light-emitting sources are arranged around the same center axis, and the second light-shielding area is used to shield lights outside an aperture of a lens of the plurality of lenses,
wherein a formula for calculating a size of the light-transmitting port is:

$$X = \frac{D}{H}L,$$

wherein X is the size of the light-transmitting port, D is an aperture of the lens, H is a distance between the light-emitting source and the lens, and L is a distance between the light-emitting source and the second shielding layer.

8. A dual-view display panel, comprising:
a backlight source configured to provide a collimated light;
a liquid crystal grating provided in a light-exiting direction of the backlight source;
a color film layer provided on a side of the liquid crystal grating away from the backlight source, wherein the color film layer comprises a plurality of first pixel areas and a plurality of second pixel areas; and
a light-shielding area provided between the first pixel area and the second pixel area which are adjacent to the light-shielding area, wherein the liquid crystal grating is configured to diffract the collimated light emitted by the backlight source to the first pixel area or the second pixel area, wherein the backlight source comprises:

a plurality of light-emitting sources;

a lens layer provided on the light-emitting source, the lens layer comprises a plurality of lenses arranged side by side, and the lens layer is configured to refract light emitted from the light-emitting source to form the collimated light;

a first shielding layer disposed on the lens layer, the first shielding layer comprises a plurality of light-exiting ports and a plurality of first light-shielding areas which are spaced apart from one another, the collimated light is radiated through the light-exiting port to form the backlight source, and the light-exiting port and the light-shielding area are arranged around a same center axis; and a second shielding layer provided between the light-emitting source and the lens layer, and the second shielding layer comprises a plurality of light-transmitting ports and a plurality of second light-shielding areas which are spaced apart from one another, the light-transmitting ports and the light-emitting sources are arranged around the same center axis, and the second light-shielding area is used to shield lights outside an aperture of a lens of the plurality of lenses, wherein a formula for calculating a size of the light-transmitting port is:

$$X = \frac{D}{H}L,$$

wherein X is the size of the light-transmitting port, D is an aperture of the lens, H is a distance between the light-emitting source and the lens, and L is a distance between the light-emitting source and the second shielding layer.

9. The dual-view display panel according to claim 8, wherein the light-emitting source is located on a focal plane of the lens.

10. The dual-view display panel according to claim 8, wherein the light-exiting port is located at a central position of the lens.

11. The dual-view display panel according to claim 8, wherein the light-exiting port comprises:

a first sub-light-exiting port through which the light is diffracted to be exited through the first pixel area;

a second sub-light-exiting port through which the light is diffracted to be exited through the second pixel area.

12. The dual-view display panel according to claim 11, wherein the first sub-light-exiting port and the second sub-light-exiting port are symmetrically arranged relative to the center axis of the first light-shielding area perpendicular to the a light-shielding surface.

13. The dual-view display panel according to claim 8, wherein an opening size of the light-exiting port is smaller than a size for shielding light of the first light-shielding area.

14. The dual-view display panel according to claim 8, wherein the dual-view display panel further comprises:

a light-receiving grating that is provided on the light-exiting port, wherein the collimated light is exited from the light-exiting port.

15. The dual-view display panel according to claim 8, wherein a quantum dot color film is provided on the color film layer.

* * * * *